(12) United States Patent
Coiro et al.

(10) Patent No.: US 10,973,204 B2
(45) Date of Patent: Apr. 13, 2021

(54) DISPOSABLE ANIMAL CAGE FOR USE IN VENTILATED RACK

(71) Applicant: ALLENTOWN, INC., Allentown, NJ (US)

(72) Inventors: John Coiro, Princeton, NJ (US); Steve Miller, Allentown, NJ (US); Alastair Maclennan, III, Hamilton, NJ (US)

(73) Assignee: Allentown, LLC, Allentown, NJ (US)

( * ) Notice: Subject to any disclaimer, the term of this patent is extended or adjusted under 35 U.S.C. 154(b) by 543 days.

(21) Appl. No.: 15/784,904

(22) Filed: Oct. 16, 2017

(65) Prior Publication Data

US 2018/0103609 A1 Apr. 19, 2018

Related U.S. Application Data

(63) Continuation-in-part of application No. 15/631,108, filed on Jun. 23, 2017.

(60) Provisional application No. 62/409,090, filed on Oct. 17, 2016.

(51) Int. Cl.
*A01K 1/03* (2006.01)

(52) U.S. Cl.
CPC .................................... *A01K 1/031* (2013.01)

(58) Field of Classification Search
CPC ........... A01K 1/03; A01K 1/031; A01K 1/032
See application file for complete search history.

(56) References Cited

U.S. PATENT DOCUMENTS

| | | | |
|---|---|---|---|
| 3,225,738 A | 12/1965 | Palencia | |
| 5,307,757 A | 5/1994 | Coiro | |
| 6,041,741 A | 3/2000 | Gabriel et al. | |
| 6,308,660 B1 | 10/2001 | Coiro, Sr. et al. | |
| 7,320,294 B2 | 1/2008 | Irwin et al. | |
| 9,265,229 B2 | 2/2016 | Conger et al. | |
| 2006/0124072 A1* | 6/2006 | Conger | A01K 1/031 119/417 |
| 2006/0254528 A1 | 11/2006 | Malnati et al. | |
| 2006/0278171 A1* | 12/2006 | Conger | A01K 1/0356 119/419 |
| 2007/0169714 A1* | 7/2007 | Conger | A01K 1/031 119/417 |

(Continued)

FOREIGN PATENT DOCUMENTS

| | | | | |
|---|---|---|---|---|
| CA | 2880064 A1 * | 1/2014 | ........... | B23K 9/1075 |
| WO | WO-2013073069 A1 * | 5/2013 | ................ | A01K 7/00 |

OTHER PUBLICATIONS

International Search Report, PCT/US17/56884, dated Feb. 20, 2018.

*Primary Examiner* — Monica L Barlow
*Assistant Examiner* — Aaron M Rodziwicz
(74) *Attorney, Agent, or Firm* — Porzio, Bromberg & Newman P.C.

(57) ABSTRACT

A disposable animal cage which can be used in a ventilated or static caging rack system includes a cage top and a cage base. Any corner or edge present in the interior of the cage base or the cage top that is accessible to an animal that can be contained in the cage is defined by surfaces having a conical section which is non-circular to prevent gnawing of the cage. A perforation section including a plurality of small apertures adjacent to one another can be formed in the cage for ventilation and prevention of gnawing by the animals.

18 Claims, 20 Drawing Sheets

(56) References Cited

U.S. PATENT DOCUMENTS

| | | | |
|---|---|---|---|
| 2007/0169715 A1* | 7/2007 | Conger | A01K 1/031 119/417 |
| 2007/0169716 A1* | 7/2007 | Conger | A01K 1/031 119/417 |
| 2007/0169718 A1* | 7/2007 | Conger | A01K 1/031 119/455 |
| 2007/0175399 A1* | 8/2007 | Conger | A01K 1/031 119/72.5 |
| 2007/0175404 A1* | 8/2007 | Conger | A01K 1/031 119/420 |
| 2007/0181070 A1* | 8/2007 | Conger | A01K 1/031 119/61.5 |
| 2007/0181074 A1* | 8/2007 | Conger | A01K 1/031 119/417 |
| 2007/0181075 A1* | 8/2007 | Conger | A01K 1/031 119/458 |
| 2008/0078332 A1* | 4/2008 | Conger | A01K 1/031 119/416 |
| 2008/0236506 A1* | 10/2008 | Conger | A01K 1/031 119/417 |
| 2008/0236507 A1* | 10/2008 | Conger | A01K 1/031 119/417 |
| 2011/0061600 A1* | 3/2011 | Conger | A01K 1/031 119/419 |
| 2011/0132272 A1* | 6/2011 | Gabriel | A01K 1/031 119/456 |
| 2012/0085291 A1* | 4/2012 | Conger | A01K 1/031 119/419 |
| 2012/0312245 A1* | 12/2012 | Lin | A01K 1/031 119/417 |
| 2014/0196666 A1* | 7/2014 | Kuzniar | A01K 1/0107 119/479 |
| 2016/0174519 A1* | 6/2016 | Chang | A01K 1/031 119/419 |

* cited by examiner

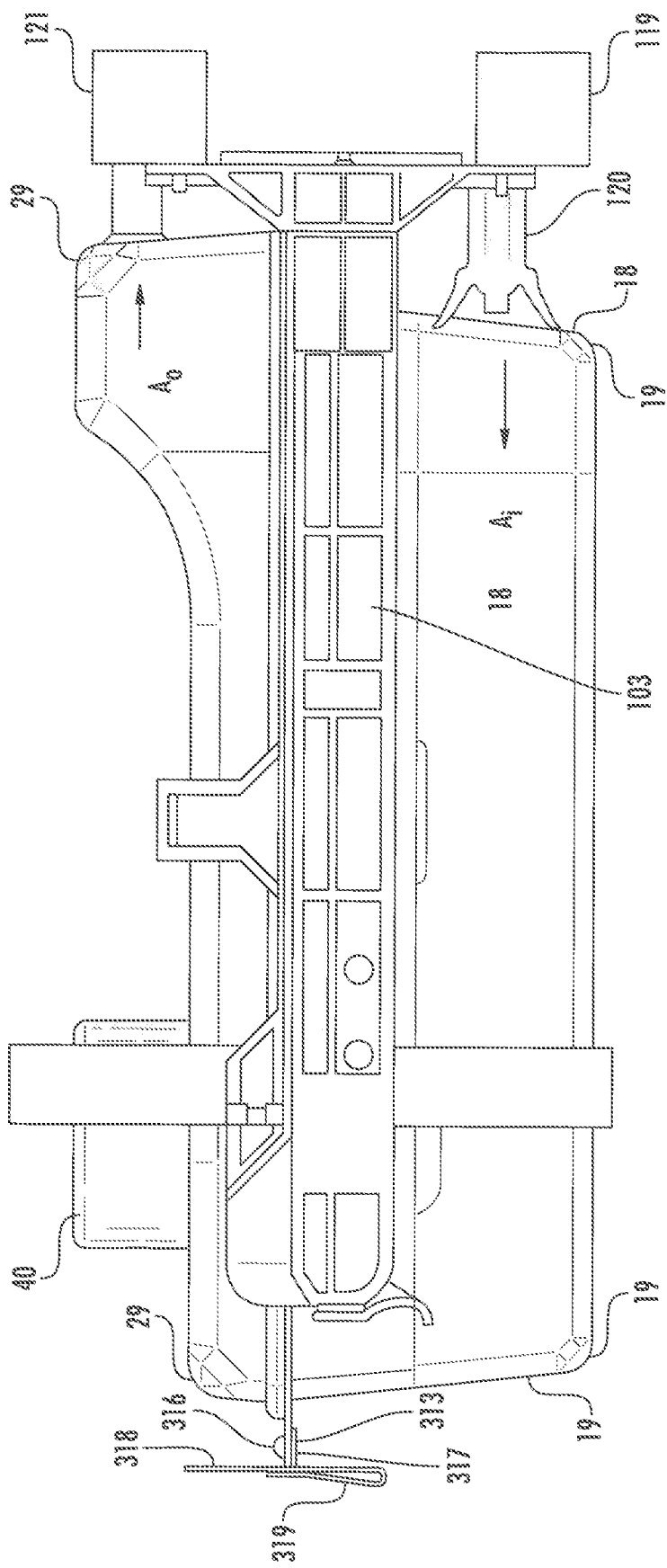

DISPOSABLE ANIMAL CAGE FOR USE IN VENTILATED RACK

BACKGROUND OF THE INVENTION

Field of the Invention

The present invention relates to a disposable animal cage which can be used in a ventilated or static caging rack system in which any corner or edge present in the interior of a cage base or cage top that is accessible to a rodent is defined by surfaces having a conical section or spline that is non-circular in order to prevent gnawing of the animal cage.

Description of Related Art

Systems for providing air and removing exhaust from racks containing animal cages are known. U.S. Pat. No. 5,307,757 describes a ventilated animal rack and animal cage system including a forced air system in which positive air is supplied by an air inlet manifold. Air is removed from the cage by negative air pressure to an exhaust manifold. The exhausted air is treated with a laboratory air treatment system or portable HEPA filtered exhaust unit and is released to the atmosphere.

U.S. Pat. No. 6,308,660 describes an animal caging system including a self-sealing or filtered opening animal cage removably connected to an air supply and an exhaust. The self-sealing or filtered opening animal cage is supported by a rack. The self-sealing or filtered opening animal cage is sealed by an air inlet connection and an air outlet connection to the air supply and the exhaust connection. After the cages are removed from the air supply and the exhaust, the air inlet connection and the exhaust connection seals the cage or has a filter media applied to the cage and top to prevent air from entering or exiting the cage.

The air supply and exhaust are provided with an air delivery and exhaust apparatus. The air delivery and exhaust apparatus is integrated with high efficiency particulate air (HEPA) filters. The air delivery and exhaust apparatus operates in a positive pressure mode for pushing air into the cage or in a negative mode for withdrawing air from the cage. Air from the environment is HEPA filtered and is used as supply air in the air delivery apparatus and exhaust air from the exhaust apparatus is HEPA filtered before being emitted into the environment. The animal caging system provides isolation of the animal cage and provides containment of airborne pathogens within the caging system.

Animal containment systems that comprise disposable, single-use components, which do not require washing and sterilization for re-use are known. U.S. Pat. No. 9,265,229 describes a single use cage preventing gnawing damage to the thin walled cage by including a geometric guidelines for the interior corners of the cage.

It is desirable to provide an improved geometric design of a disposable animal cage which prevents animals from gnawing on the cage surfaces and having low manufacturing costs.

SUMMARY OF THE INVENTION

The present invention relates to a disposable animal cage which can be used in a ventilated or static caging rack system. The animal cage can be a free-standing cage assembly constructed of a cage base and a cage top. The animal cage can be used with rodent animals or similar sized species.

The cage base comprises walls extending from a floor. The walls can be integral with the floor. The cage top comprises walls extending from a ceiling or a flat top. The cage base and the cage top can be constructed of a polymer. Any or all walls and the floor of the cage base can have a material thickness between about 0.005 inches to about 0.125 inches. Any or all walls of the cage top can have a material thickness between about 0.005 inches to about 0.125 inches.

Any corner or edge present in the interior of the cage assembly of the cage base or the cage top that is accessible to a rodent that can be contained in the cage is defined by surfaces having an angle greater than or equal to 180 degrees and less than or equal to 360 degrees. Any corner or edge present in the interior of the cage assembly of the cage base or the cage top that is accessible to a rodent that can be contained in the cage can be defined by surfaces having a conical section which is non-circular. A conical section can be formed in a wall of the cage base toward the interior of the cage base. For example, the conical section can be a parabola, ellipse, hyperbola or spline. The design of the animal cage having a corner, wall or edge in the interior of the cage assembly with a conical section or spline can prevent an animal from gnawing the cage base or the cage top.

The cage top can include a water housing mount pocket. The water housing mount pocket receives a container. The container includes an aperture. The aperture can be formed within a cap of the container. An aperture in the water housing mount pocket can permit access by the animal to the aperture of the container received within the water housing mount/pocket. The aperture of the container can be licked by the animal to dispense water stored within the container. The water housing mount pocket can have a conical or spline shape to prevent an animal from gnawing the water housing mount pocket and the container.

A feed tray can include side walls angled toward feed aperture. An edge of the feed tray can be received in a depression of the cage base for removably attaching the feed tray to the cage base. The feed tray can be disposed beneath an air filter of the cage top. The feed tray location within the animal cage provides protection of the filter from being gnawed or punctured and prevents escape of the animals from the animal cage.

The cage base and cage top can be snap fitted to one another. A top edge of the cage base extending from the cage base creates a suspended runner system allowing the animal cage to be installed on rows of a ventilated rack or a static air rack to automatically lock the cage top and cage base together.

In one embodiment, a plurality of apertures are positioned in a side wall of the cage base and the cage top. Filter media can be positioned over the plurality of apertures. In this embodiment, an air inlet port can be placed adjacent the filter media to allow air to flow from the air inlet port into the cage through the small apertures of the cage base. An air exhaust port can be placed adjacent the filter media to allow air to flow from the cage to the air exhaust port through the small apertures of the cage top.

The cage and/or cage top can include a plurality of small apertures in close proximity to one another. The top is formed of a flat ceiling with walls extending from the ceiling. The structure prevents animals from chewing, scratching or altering the plastic cage and/or cage top to prevent escaping animals as well as protect the filter media while allowing air to exchange between the cage assembly by forced air or natural flow methods. The small apertures can be manufactured by removing material from the cage and/or cage top from inside of the cage and/or cage top towards the outside of the cage and/or cage top such that any burr created during the manufacturing process is positioned on an outside surface of the cage/top. Alternatively, the small apertures can be manufactured by removing material from the cage/top from outside of the cage and/or cage top towards the inside of the cage such that any burr created during the manufacturing process is positioned at a portion of the cage which is inaccessible by an animal received in the cage. The cage can be used in a ventilated or static embodiment.

The cage base can be counter bowed to strengthen the cage base. The strengthened cage base can reduce or eliminate sagging of the cage base caused by weight of bedding, animal(s) or excretion by the animal(s).

In one embodiment, the cage top can include a pair of water housing mount pockets for receiving respective water containers. The cage top can include one or more openings for ventilation. The one or more openings can be covered by a filter media. A structure including a front section and a rear section is configured to be received under the cage top, The front section being positioned below the water housing mount pockets and the rear section being positioned below the one or more openings, The structure can be formed of a plurality of wires or sheet metal in a frame configuration.

The invention will be more fully described by reference to the following drawings.

BRIEF DESCRIPTION OF THE DRAWINGS

FIG. 12 is a schematic diagram of the cage assembly shown in FIG. 11A including a connection to an inlet air and an exhaust.

DETAILED DESCRIPTION

Figure 1A:
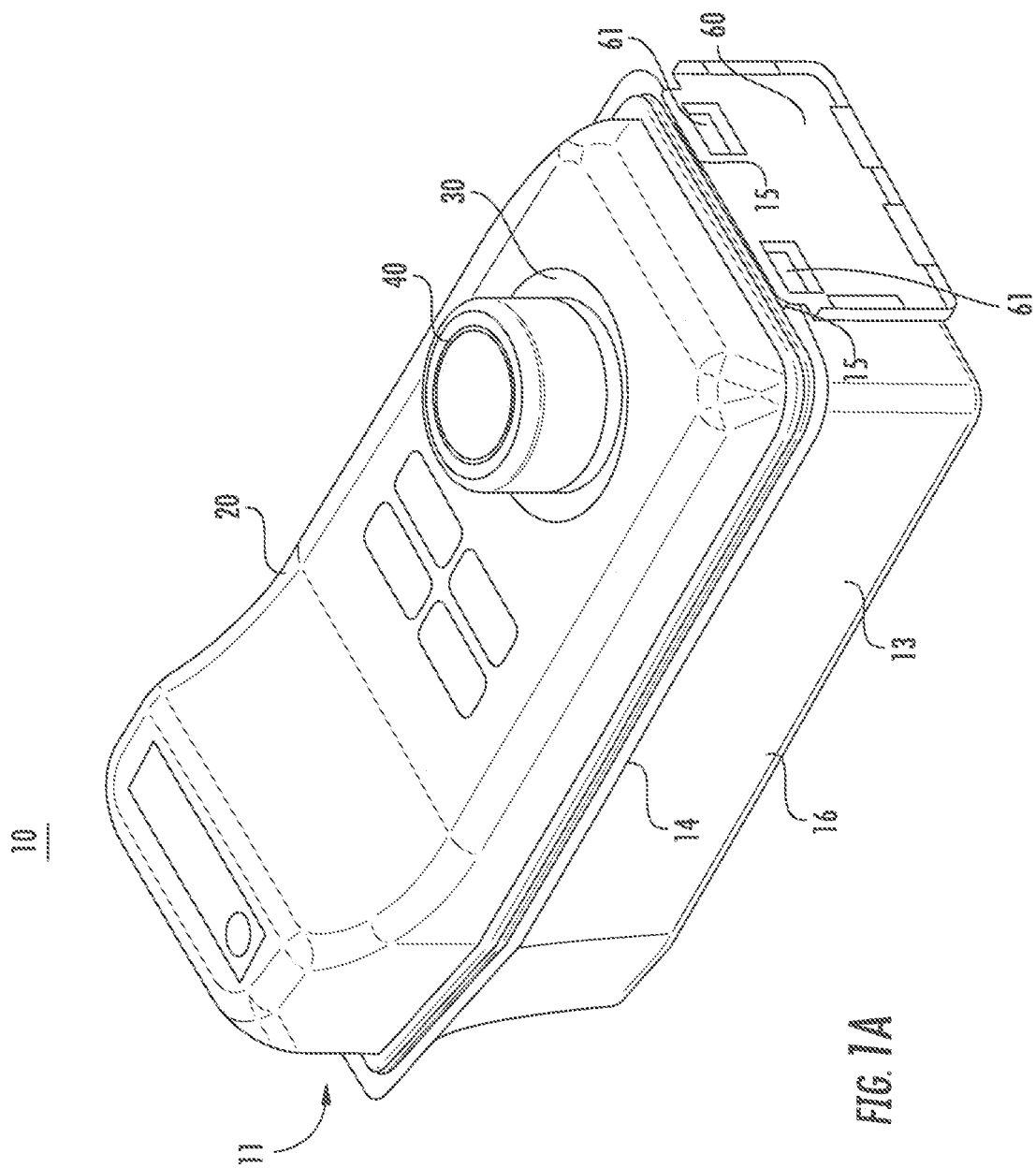
FIG. 1A illustrates a perspective view of an animal cage assembly in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1B:
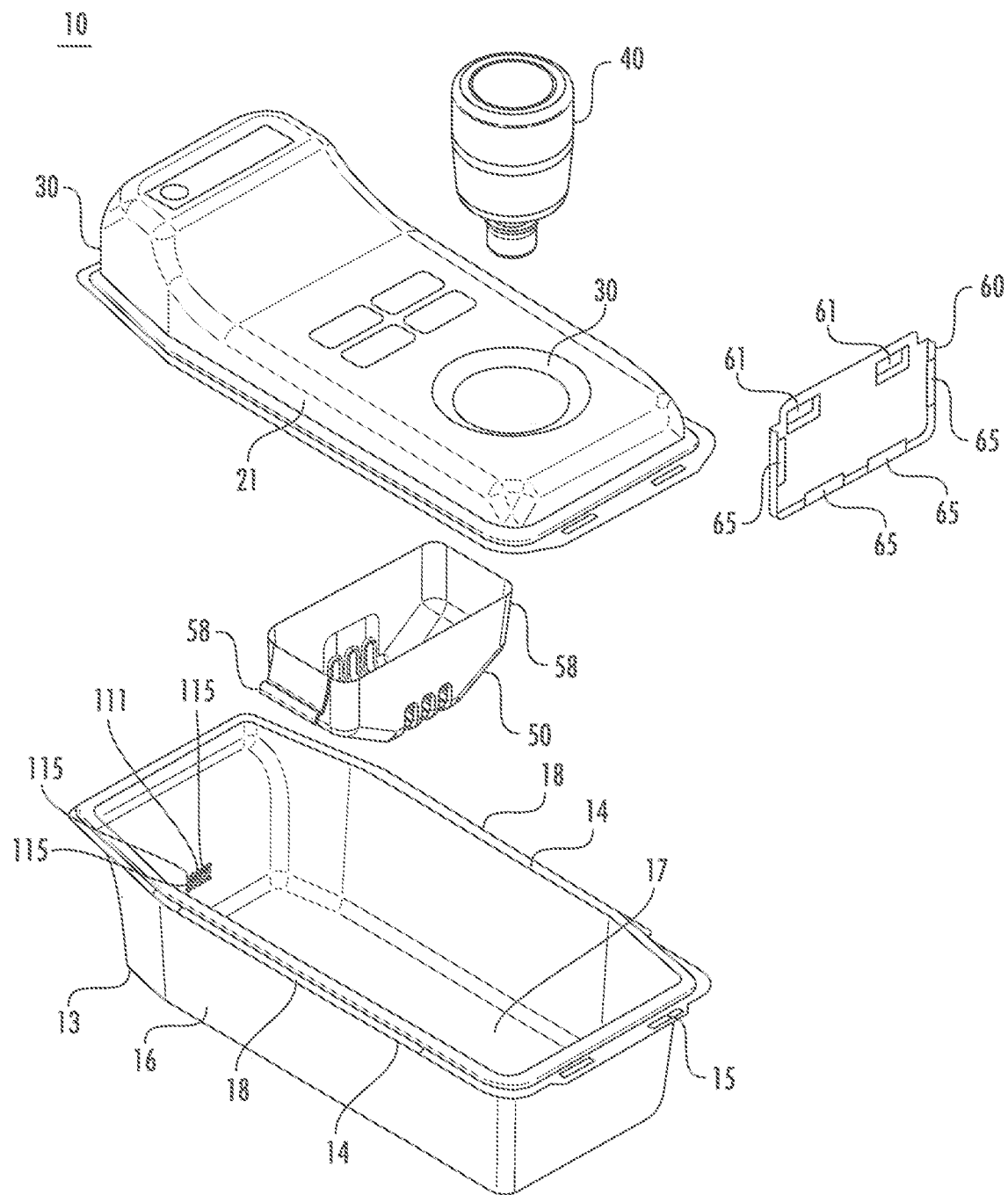
FIG. 1B illustrates a perspective view of an animal cage assembly before being assembled in accordance with the teachings of the present invention.

FIGS. 1A-1B illustrate cage assembly 10 in accordance with the teachings of the present invention including cage 11. Cage 11 includes cage base 13 and cage top 20 as shown in FIG. 1A.

Water housing mount pocket 30 is formed in cage top 20. Water housing 40 is removably received in water housing mount pocket 30. Feed tray 50 is removably supported by top edge 14 of cage base 13 as shown in FIG. 1B. Card holder 60 is removably coupled to lip 19 of cage base 13.

Figure 2:
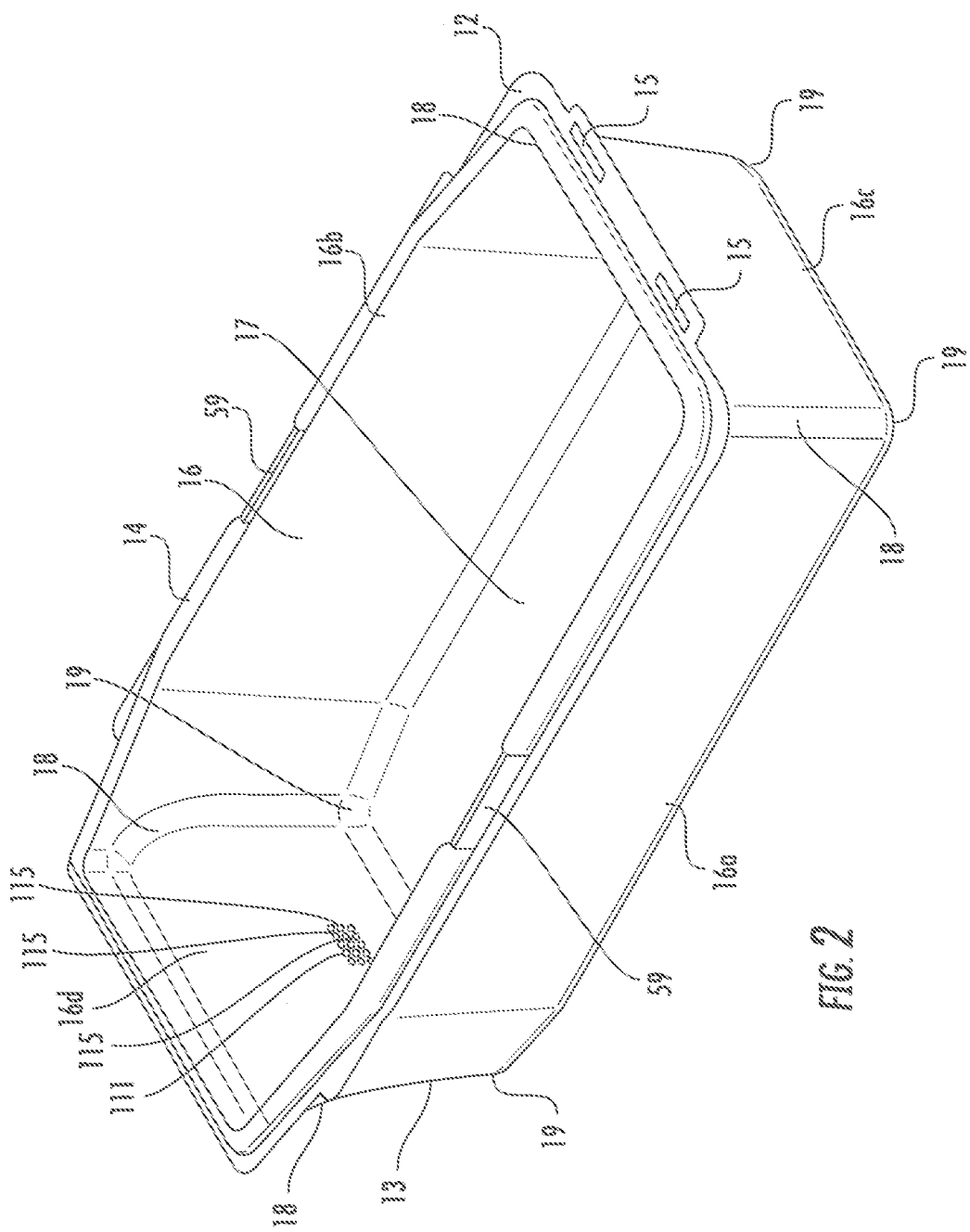
FIG. 2 illustrates an isometric view of a base of the cage shown in FIG. 1B.

Cage base 13 includes walls 16 extending from floor 17 as shown in FIG. 2. Walls 16 and floor 17 can be integral to one another. Walls 16 can include side walls 16a and 16b on either side of cage base 13. Walls 16 can include front wall 16c and rear wall 16d. Top edge 14 of side walls 16a and 16b can include depressions 18. Walls 16 of cage base 13 support cage top 20 on top edge 14 as shown in FIG. 1A. Cage base 13 and cage top 20 can be snap fitted to one another. Top edge 14 of cage base 13 extends from cage base 13.

Referring to FIG. 2, lip 12 can extend around cage base 13 below top edge 14. Lip 12 can include card holder mount apertures 15 or slide protrusion. Edge junction 18 can be formed between adjacent walls 16. For example, edge junction 18 can be formed respectively between side wall 16a and front wall 16c and side wall 16a and rear wall 16d. Edge junction 18 can be formed respectively between side wall 16b and front wall 16c and side wall 16b and rear wall 16d. Corner junction 19 can be formed between adjacent walls 16 and floor 17. For example, corner junction 19 can be formed respectively between: side wall 16a, front wall 16c and floor 17; side wall 16a, rear wall 16d and floor 17; side wall 16b, front wall 16c and floor 17; and side wall 16b, rear wall 16d and floor 17.

Figure 3:
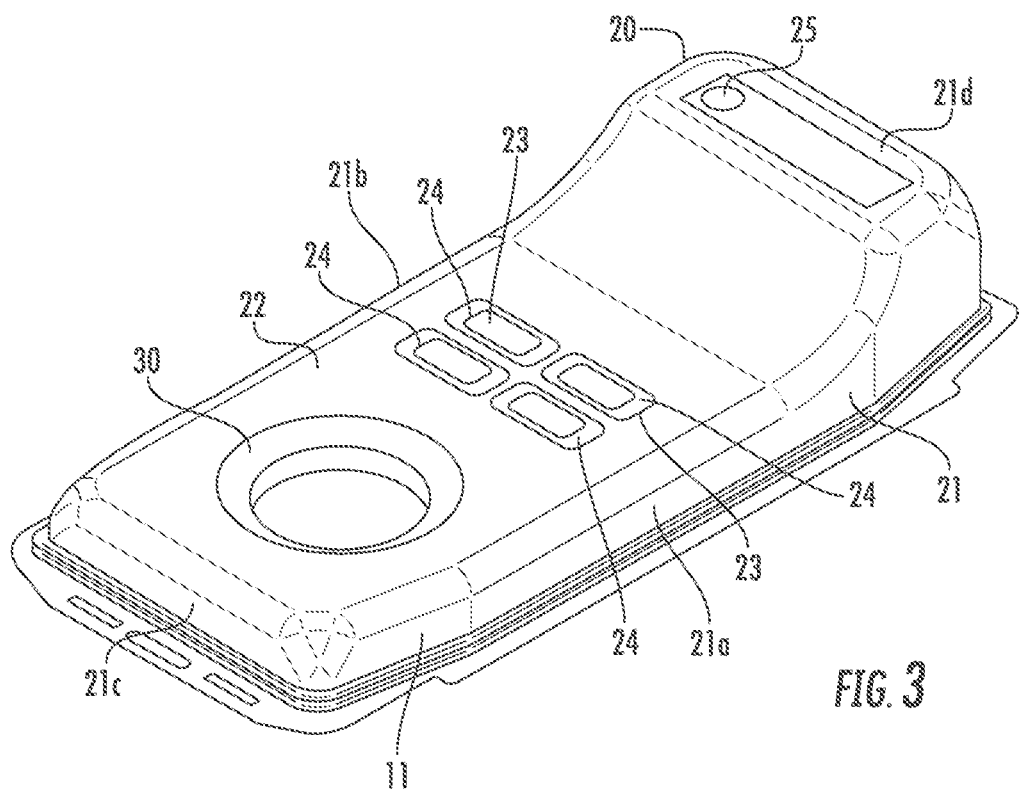
FIG. 3 illustrates a top isometric view of a top of the cage shown in FIG. 1B.
Figure 4:
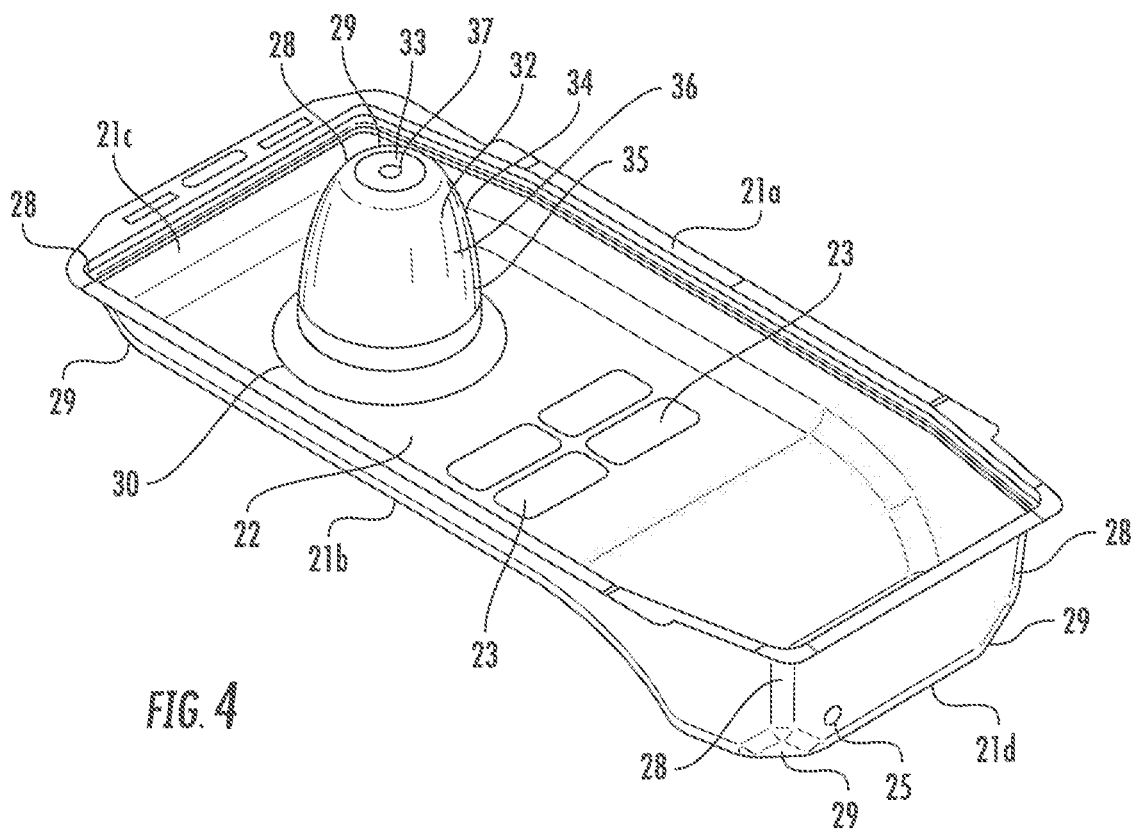
FIG. 4 illustrates a bottom isometric view of the top of the cage shown in FIG. 1B.

Referring to FIGS. 3 and 4, cage top 20 includes walls 21 extending from ceiling 22. Walls 21 and ceiling 22 can be integral to one another. Walls 21 may or may not include side walls 21a and 21b on either side of cage top 20. Walls 21 may or may not include front wall 21c and rear wall 21d. One or more openings 23 can be formed in ceiling 22. One or more openings 23 can be covered by one or more filters 24. One or more openings 23 can be used to receive air. Air exhaust port 25 can be formed or punched in rear wall 21d or ceiling 22 of cage top 20 as shown in FIG. 4.

Edge junction 28 can be formed between adjacent walls 21 as shown in FIG. 4. For example, edge junction 28 can be formed respectively between side wall 21a and front wall 21c and side wall 21a and rear wall 21d. Edge junction 28 can be formed respectively between side wall 21b and front wall 21c and side wall 21b and rear wall 21d. Corner junction 29 can be formed between adjacent walls 21 and ceiling 22. For example, corner junction 29 can be formed respectively between: side wall 21a, front wall 21c and ceiling 22; side wall 21a, rear wall 21d and ceiling 22; side wall 21b, front wall 21c and ceiling 22; and side wall 21b, rear wall 21d and ceiling 22.

Water housing mount pocket 30 includes conical support 32. Conical support 32 includes bottom end 33, lower end 34 and upper end 35. Lower end 34 extends to bottom end 33. Conical section 36 is positioned at lower end 34 to extend between bottom end 33 and upper end 35. Bottom end 33 can be substantially flat. Aperture 37 is formed or punched in bottom end 33.

Cage base 13 and cage top 20 can be constructed of a polymer. Suitable polymer materials include, but not limited to polyethylene terephthalate. Any or all walls 16 and floor 17 of cage base 13 can have a material thickness between about 0.005 inches to about 0.125 inches. Any or all walls 21 and ceiling 22 of cage top 20 can have a material thickness between about 0.005 inches to about 0.125 inches.

Figure 5B:
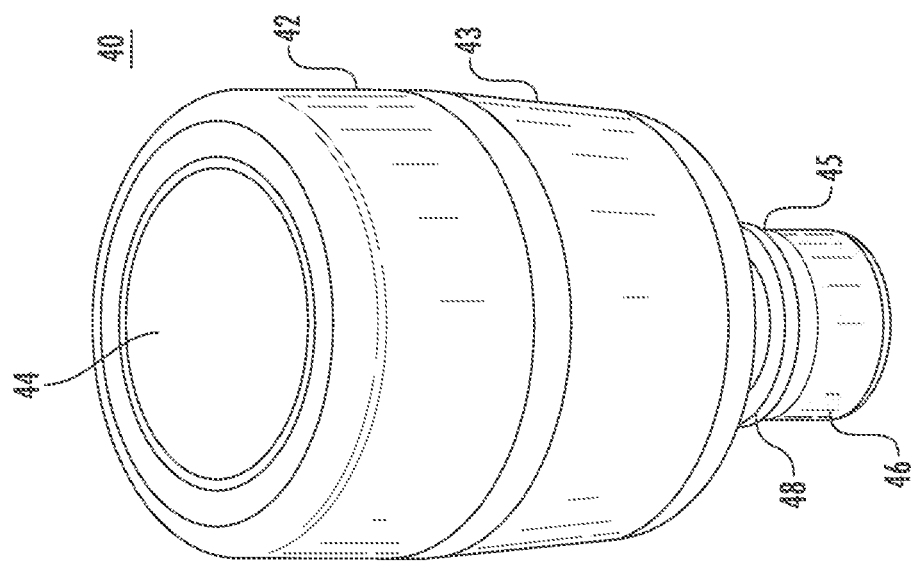
FIG. 5B illustrates a illustrates a bottom isometric view of a water housing shown in FIG. 1B.
Figure 5A:
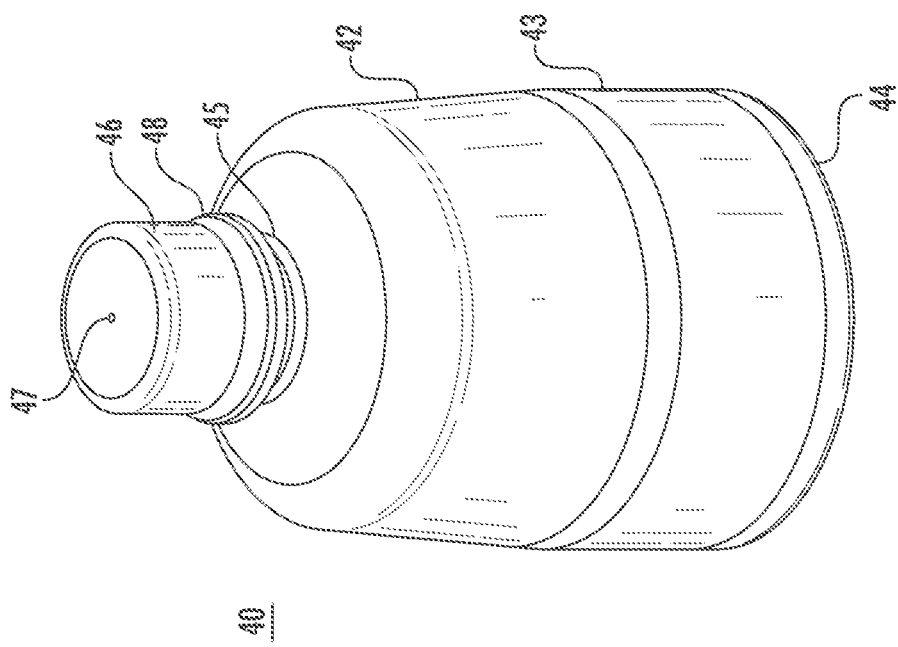
FIG. 5A illustrates a top isometric view of a water housing used in the animal cage assembly shown in FIG. 1B.
Figure 7:
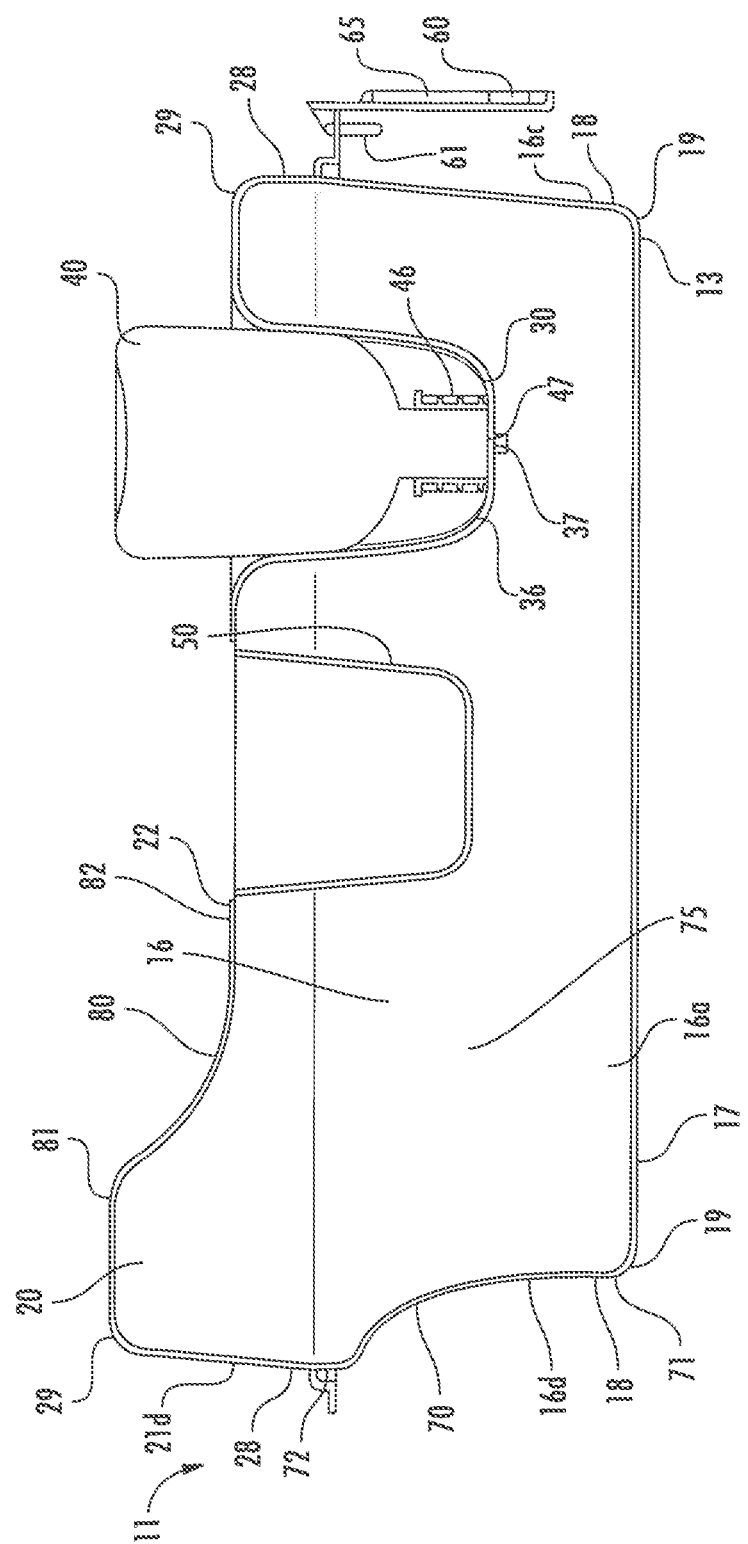
FIG. 7 illustrates a side cross-section view of the base of the cage shown in FIG. 1B.

Water housing 40 can include container 42 as shown in FIGS. 5A-5B. Container 42 can have wall or walls 43 extending from bottom 44 to neck 45. Container 42 can be used to house water. In one embodiment, container 42 can have a bottle shape. Cap 46 is removably attached to top lip 48 of neck 45. Cap 46 can have aperture 47. During use, water housing 40 is inverted and to allow cap 46 to be received in water housing mount pocket 30. Aperture 47 of cap 46 is aligned with aperture 37 of water housing mount pocket 30 as shown in FIG. 7. An animal can lick through aperture 37 to reach aperture of 47 of cap 46 in order to receive water retained in container 42.

Figure 6:
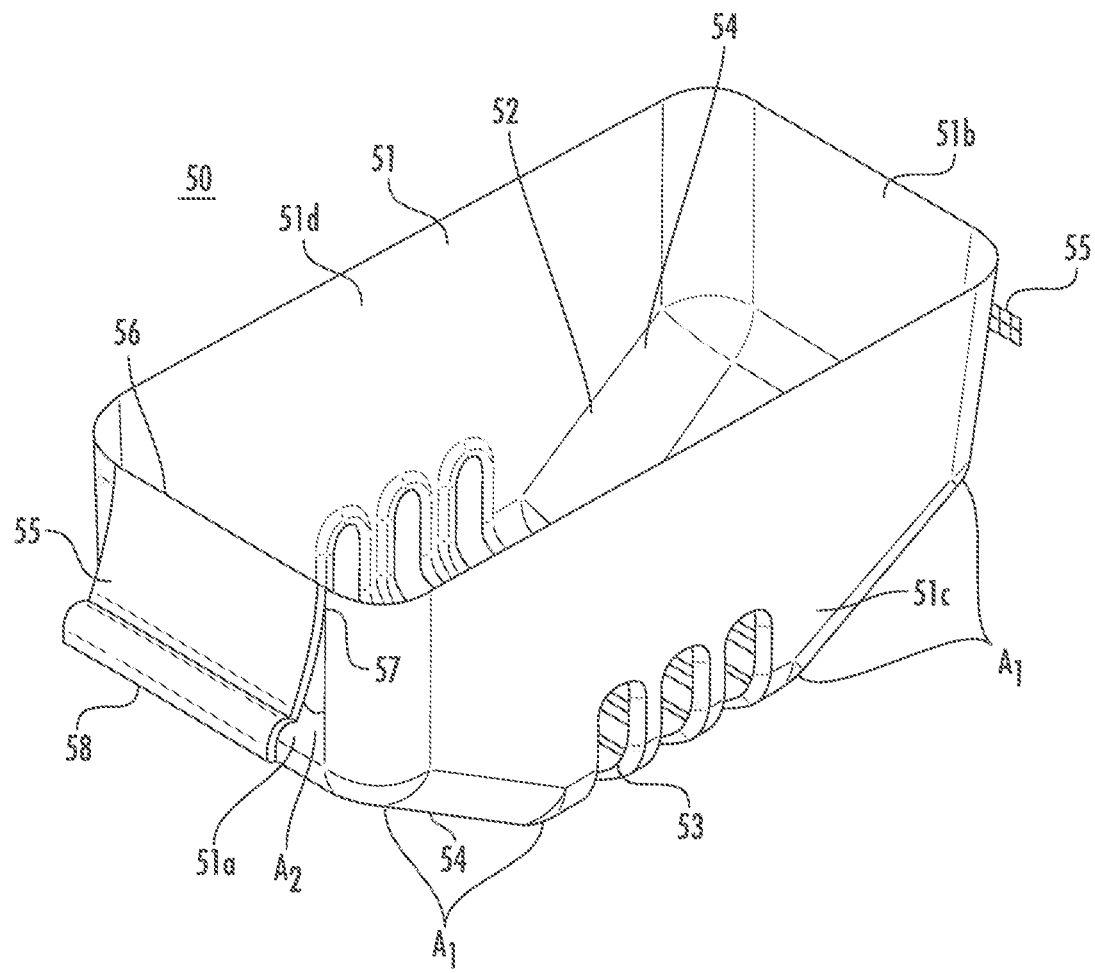
FIG. 6 illustrates an isometric view of a feed tray used in the animal cage assembly shown in FIG. 1B.

Referring to FIG. 6, feed tray 50 includes walls 51 extending from floor 52. Walls 51 can include side walls 51a and 51b on either side of feed tray 50. Walls 51 can include front wall 51c and rear wall 51d. Section 54 of floor 52 adjacent side walls 51a and 51b can be angled by Angle A1 toward feed apertures 53. Lip 55 can extend from top edge 56 of feed tray 50. Top 57 of lip 55 can be angled by Angle A2 to edge 58 of lip 55. Edge 58 can be curved. Edge 58 of feed tray 50 can be received in depression 59 of cage base 13 for removably attaching feed tray 50 to cage base 13 as shown in FIG. 1B. Depression of 59 can be positioned adjacent one or more filters 24 to allow feed tray 50 to be positioned underneath one or more filters 24 when feed tray 50, cage base 13 and cage top 20 are assembled as shown in FIG. 1B.

Referring to FIGS. 1A and 1B, mount projections 61 of card holder 60 can be received in card holder mount apertures 15 of lip 12 of cage base 13 to attach card holder 60 to cage base 13. Card holder 60 includes lip projections 65. Lip projections 65 can be used to retain a card (not shown) identifying the cage and/or animals within the cage.

Referring to FIG. 7, each edge junction 18 or corner junction 19 of wall or walls 16 and/or floor 17 that are accessible to a rodent that can be contained in cage 11 are defined by surfaces having an angle greater than or equal to about 180 degrees and less than or equal to about 360 degrees (180≤σ≤360). Each edge junction 18 or corner junction 19 of wall or walls 16 and/or floor 17 that are accessible to a rodent that can be contained in cage 11 can be defined by surfaces with a conical shape. Each edge junction 28 or corner junction 29 of wall or walls 21 and/or ceiling 22 that are accessible to a rodent that can be contained in cage 11 are defined by surfaces having an angle greater than or equal to about 180 degrees and less than or equal to about 360 degrees (180≤σ≤360). Each edge junction 28 or corner junction 29 of wall or walls 21 and/or ceiling 22 that are accessible to a rodent that can be contained in cage 11 can be defined by surfaces having a conical shape. For example, the conical shape can be a parabola, ellipse, hyperbola or spline.

Figure 8A:
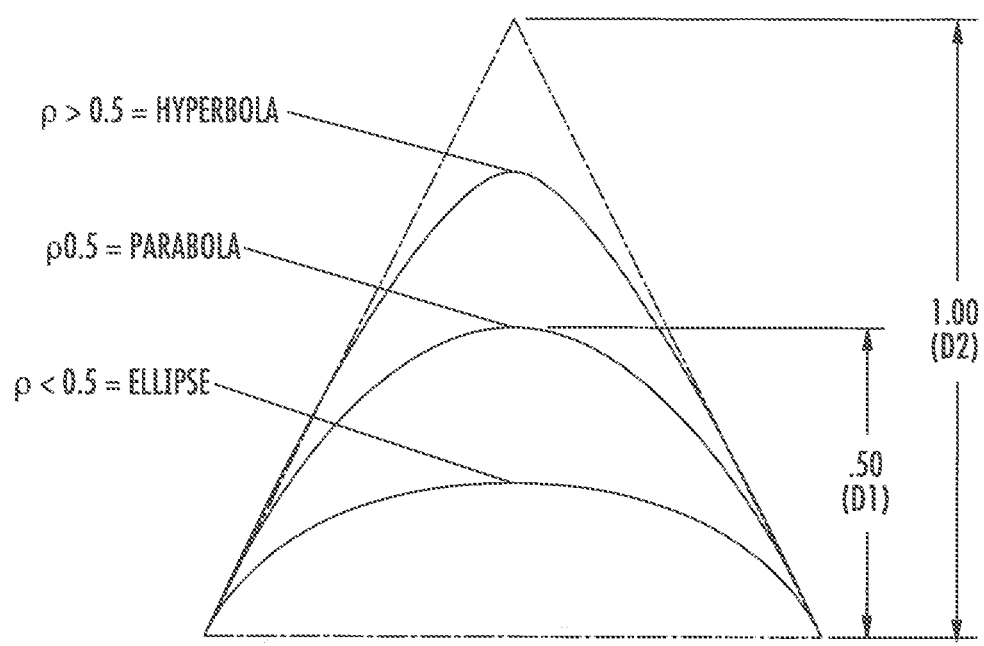
FIG. 8A is a schematic diagram of shapes which can be used with surfaces of the cage.

Cage base 13 includes conical section 70 formed in rear wall 16d toward interior 75 of cage base 13. Conical section 70 is positioned to extend between bottom end 71 and upper end 72 of rear wall 16d. Conical section 70 can have a conical shape of a parabola, ellipse, hyperbola or spline as shown in FIG. 8A.

Referring to FIG. 7, cage top 20 includes conical section 80 formed in ceiling 22. Conical section 80 is positioned to extend between rear section 81 adjacent to rear wall 21d and mid-section 82 of ceiling 22. Conical section 80 can have a conical shape of a parabola, ellipse, hyperbola or spline as shown in FIG. 8A.

Referring to FIG. 7, cage top 20 includes water housing mount pocket 30 including conical section 36. Conical section 36 can have a conical shape of a parabola, ellipse, hyperbola or spline as shown in FIG. 8A.

Figure 8B:
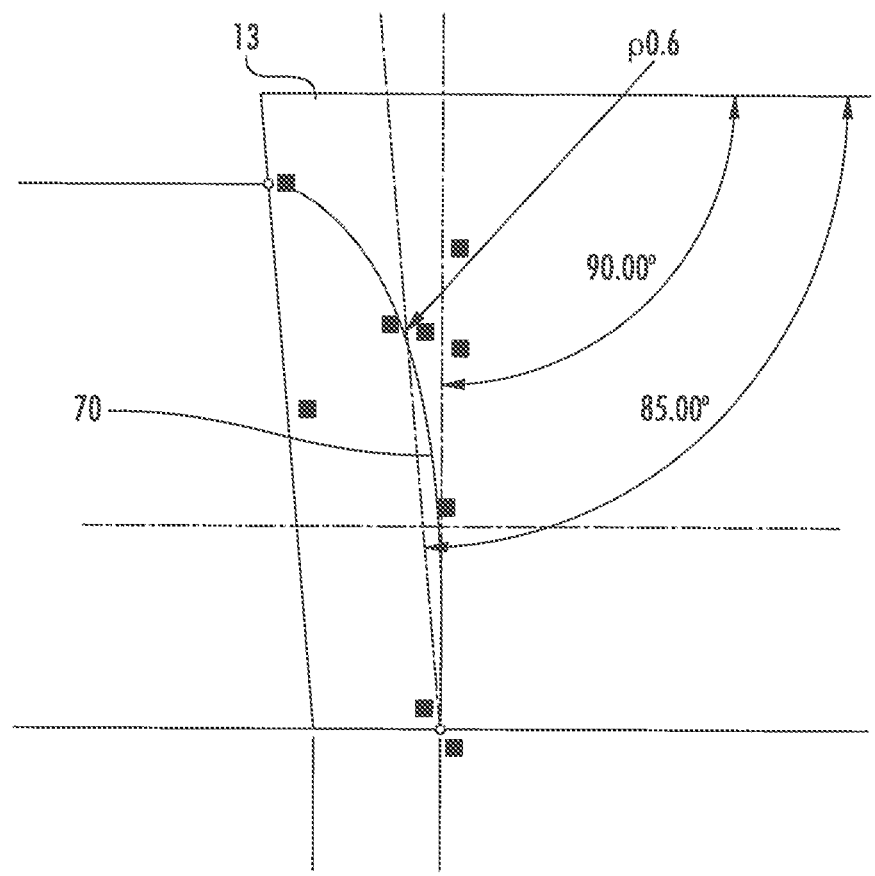
FIG. 8B is a partial side view of the base of the cage including a hyperbola surface.

In one embodiment, conical section 70 formed in cage base 13 can be formed in the shape of a hyperbola as shown in FIG. 8B.

Figure 9:
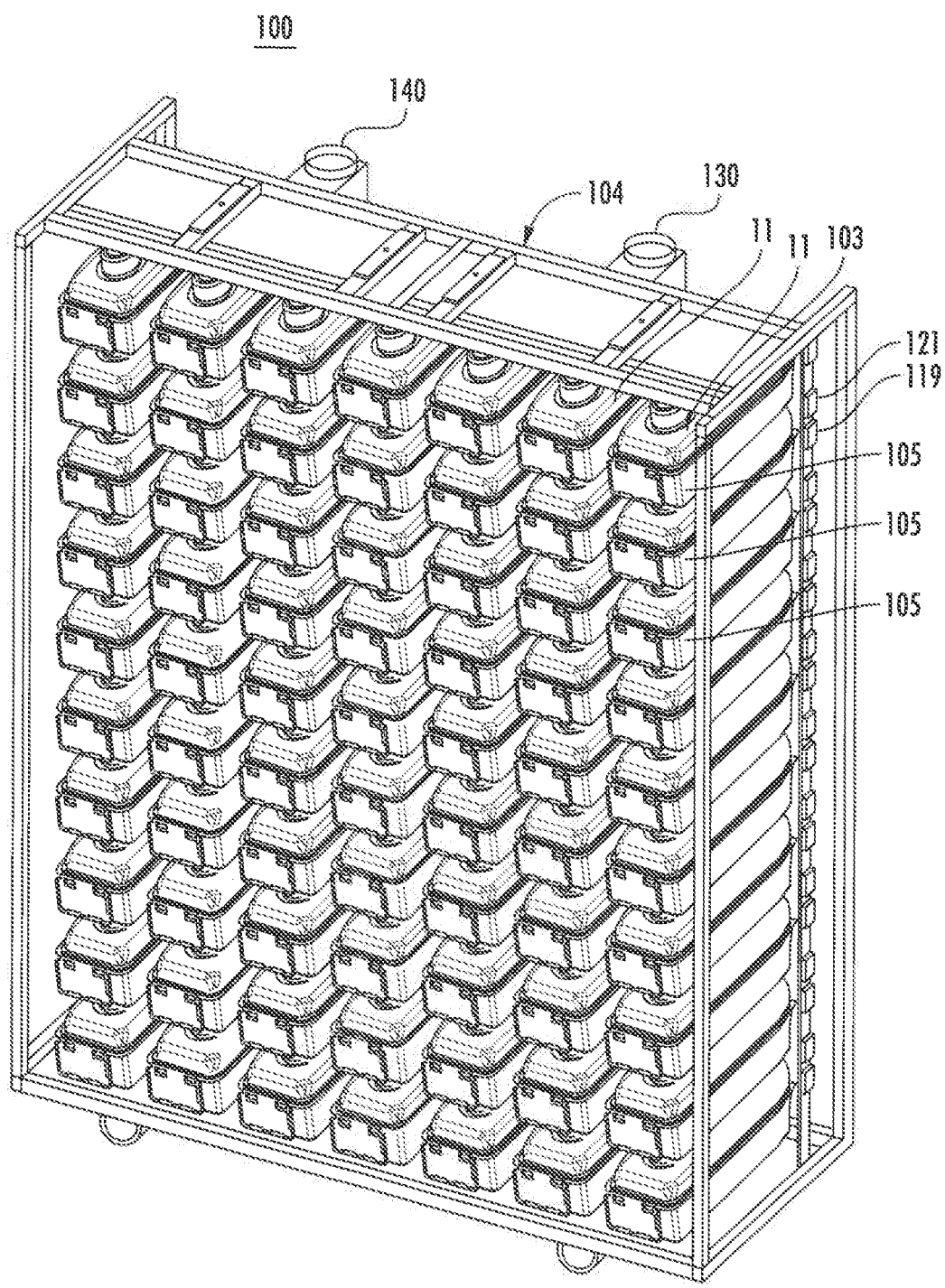
FIG. 9 is a schematic diagram of a plurality of the cage assemblies of the present invention used in a ventilated rack and or a static rack.

FIG. 9 shows an embodiment of animal cage system 100. Individual cages 11 are supported on at least one shelf, platform or suspended runner system 103 on rows 105 of rack 104. Cage base 13 and cage top 20 can be snap fitted to one another. Top edge 14 of cage base 13 extending from cage base 13 can be received within suspended runner system 103 for automatically locking cage base 13 and cage top 20 together. Animal cage system 100 can be a ventilated rack or a static air rack. Example animal cage racks are manufactured by Allentown, Inc. as Nexgen, Micro-Vent and PNC.

Figure 10:
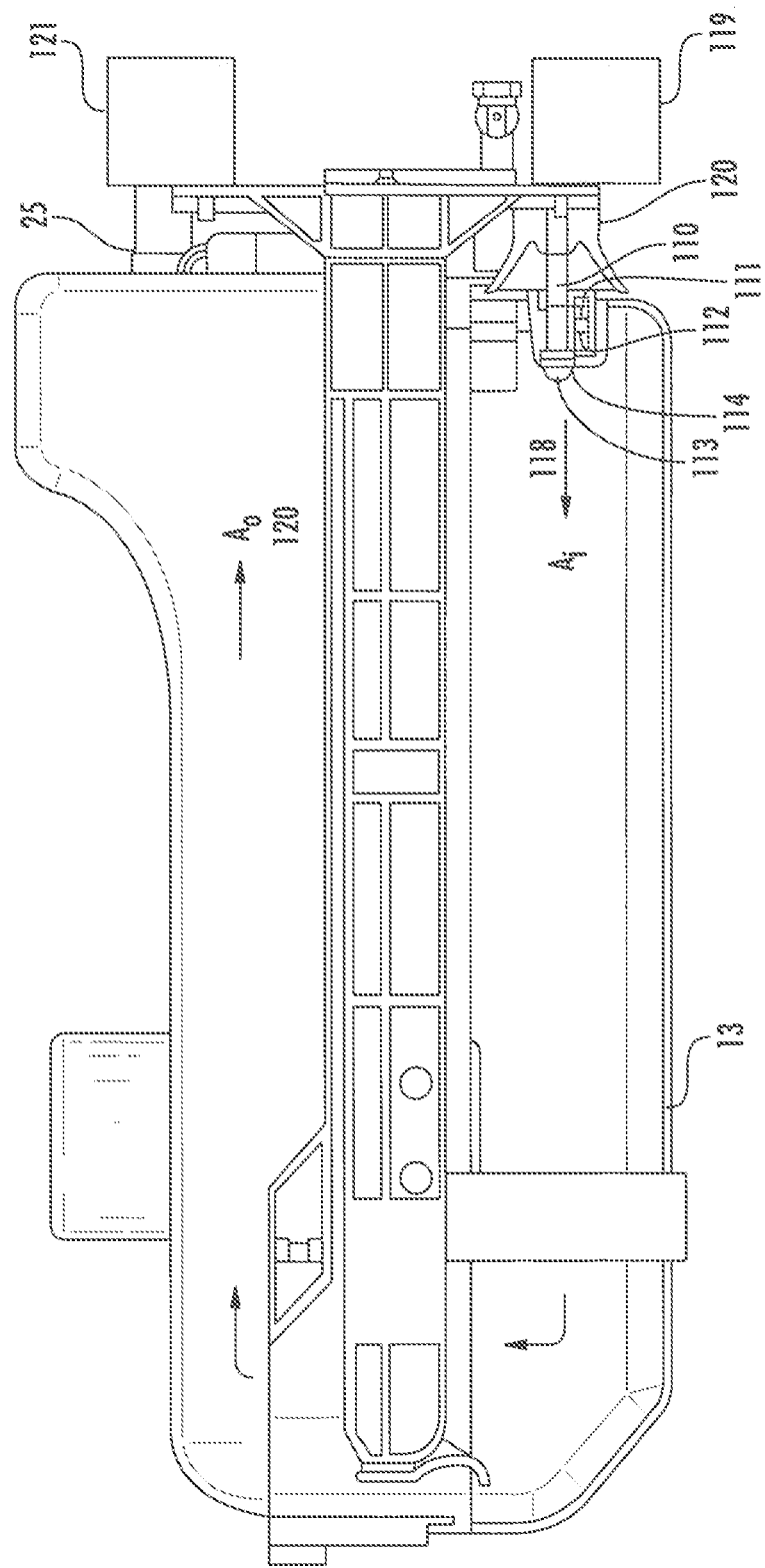
FIG. 10 is a schematic diagram of the cage assembly shown in FIG. 1A including a connection to an inlet air and an exhaust.
Figure 11A:
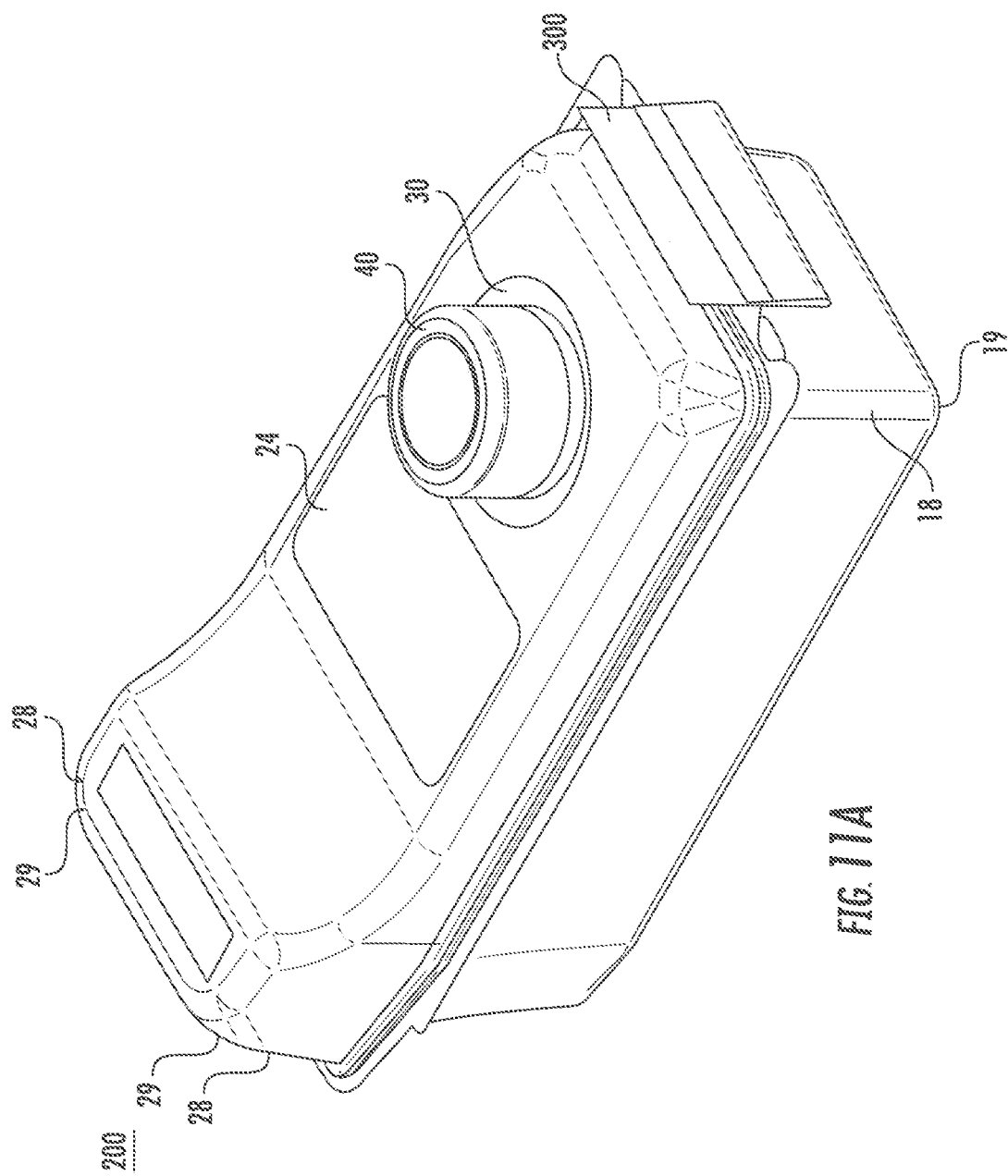
FIG. 11A illustrates a perspective view of an animal cage assembly in accordance with the teachings of the present invention.
Figure 11B:
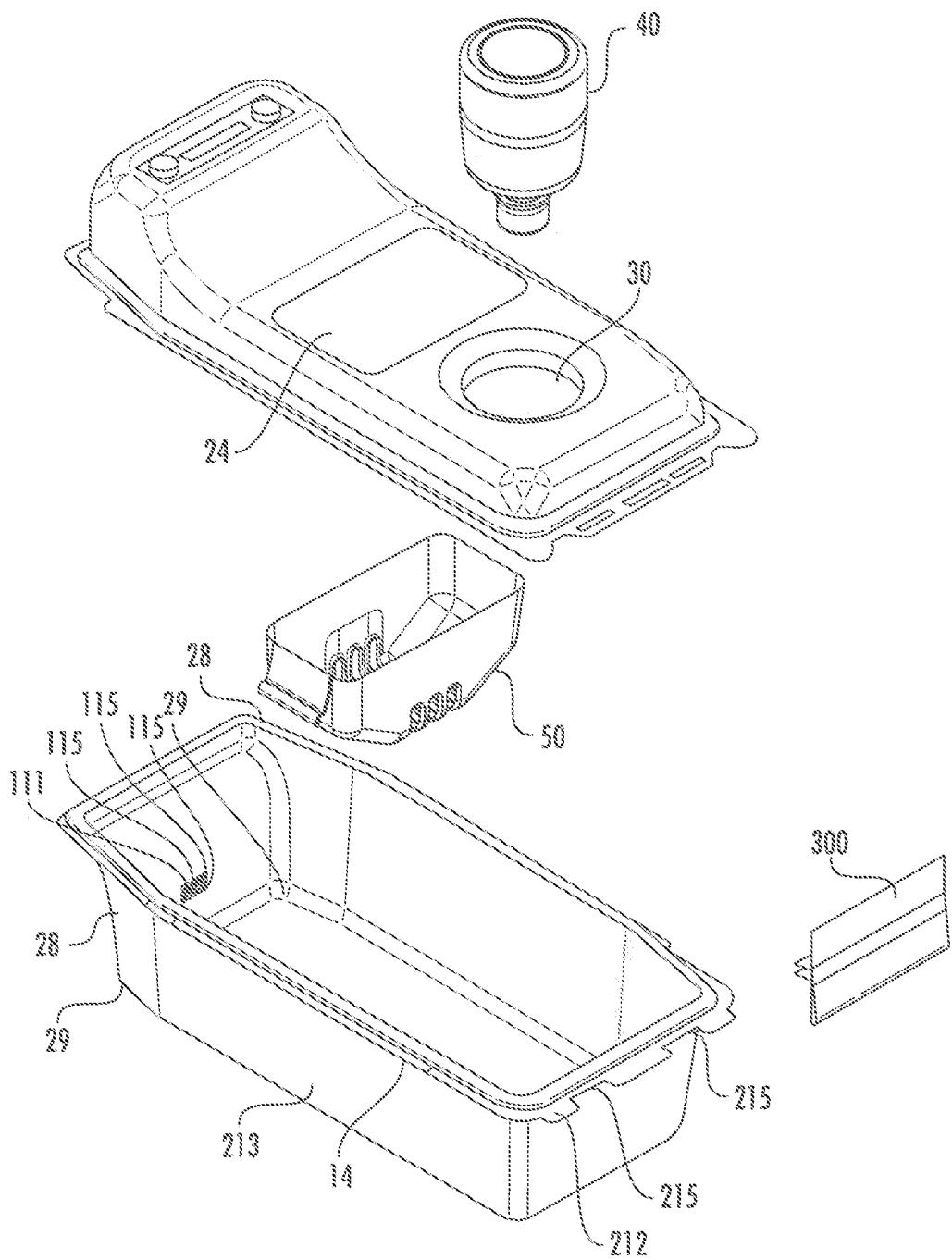
FIG. 11B illustrates a perspective view of the animal cage assembly shown in FIG. 11A before being assembled in accordance with the teachings of the present invention.
Figure 11C:
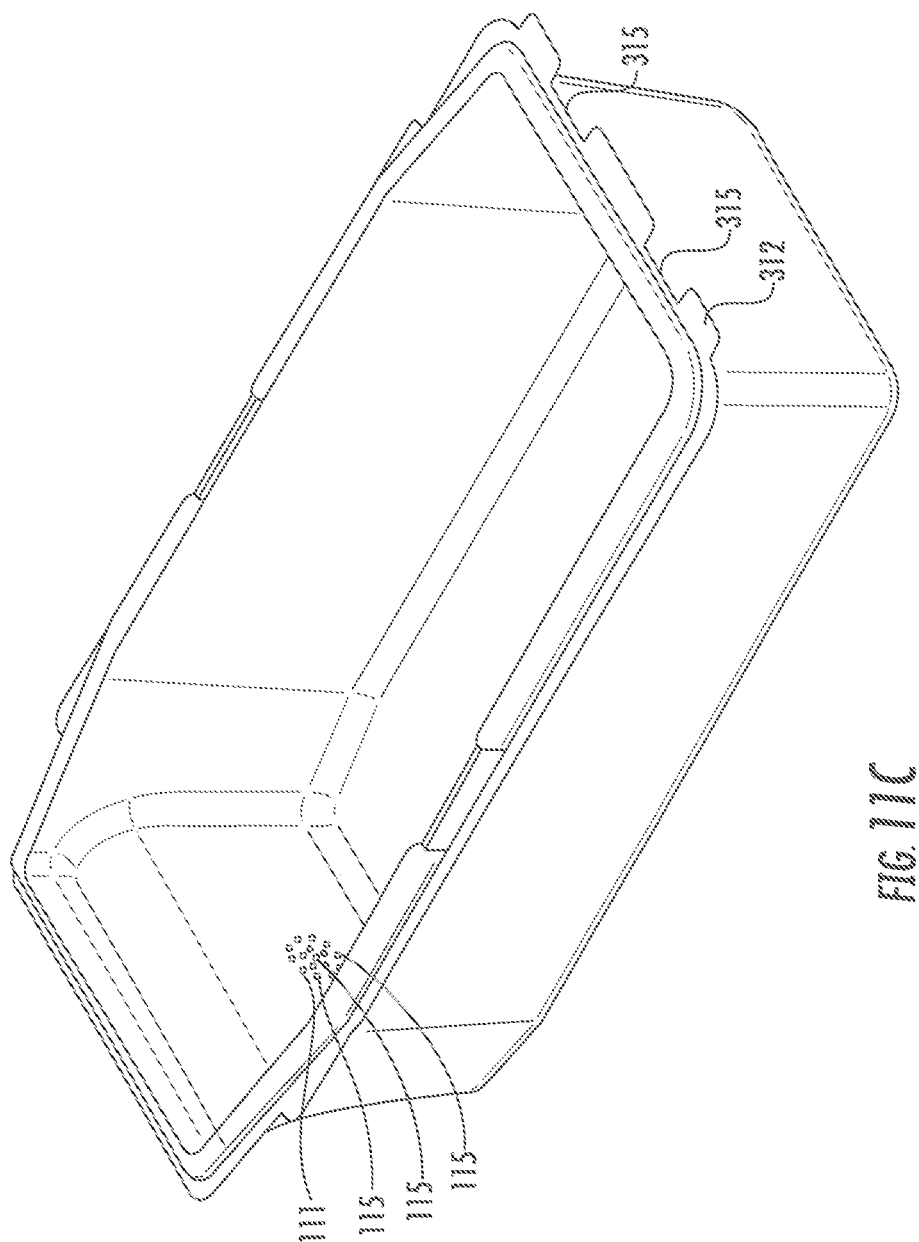
FIG. 11C illustrates an isometric view of a base of the cage shown in FIG. 11A.
Figure 11D:
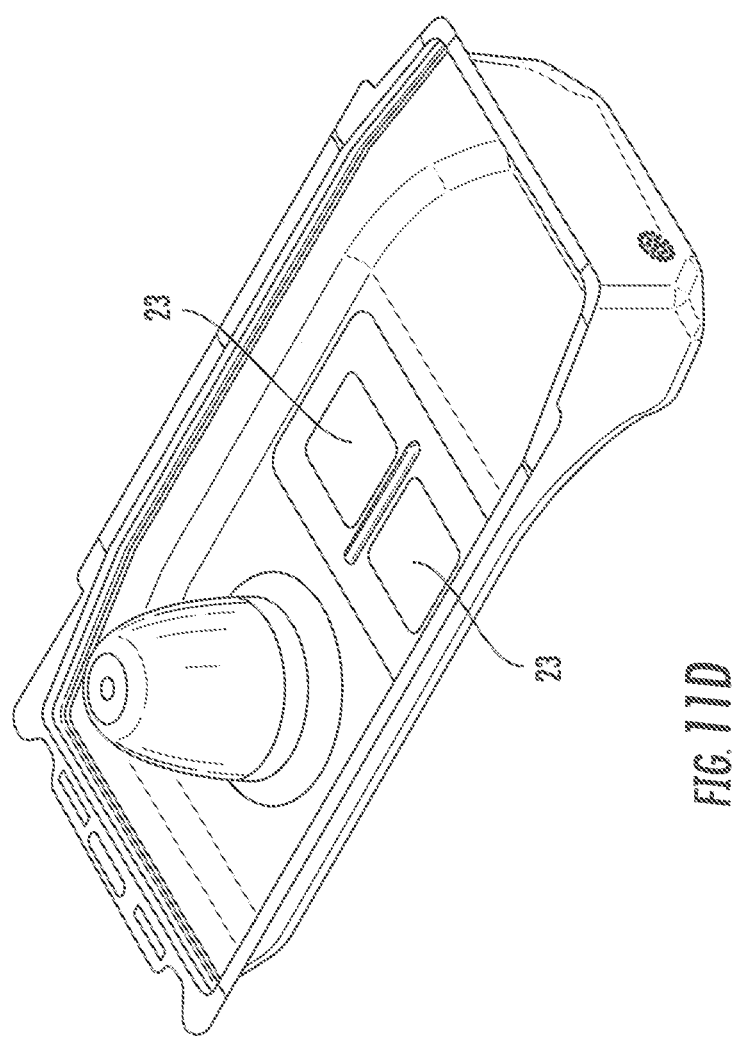
FIG. 11D illustrates a top isometric view of a top of the cage shown in FIG. 11A.

FIG. 10 illustrates air delivery and exhaust which can be used with animal cage system 100 to provide a ventilated rack. Nozzle 110 can be received or positioned adjacent air inlet port 111 shown in FIG. 2. Referring to FIG. 10, filter 112 can cover air inlet port 111. Nozzle 110 includes at least one air opening 113 formed in end 114 of nozzle 110 for emitting air 118 from air inlet plenum 119 through inlet 120 into cage 11 in the direction of arrow $A_i$. Air 118 circulates within cage 11 and exits cage 11 in the direction of arrow $A_o$ as exhaust 120 through exhaust plenum 121. Exhaust plenum 121 can be coupled or adjacent to air exhaust port 25 of cage top 20.

Referring to FIG. 9, at least one supply blower or equivalent can be coupled rack air input port 130 and at least one exhaust blower or equivalent can be coupled to rack exhaust port 140 for supplying air to rack 104 and removing exhaust from rack 104. Alternatively air delivery and exhaust apparatus can supply and exhaust air via wall mounted or tower blower ventilation system, such as one manufactured by Allentown Inc. as an EcoFlo Rack, EcoFlo Tower, or EcoFlo Halo. Alternatively air delivery and exhaust apparatus can be supplied by an above ceiling or remotely mounted air supply device such as one manufactured by Allentown Inc. Eco Flo Interstitial Blower while using the facility available exhaust system to exhaust the rack such as demonstrated in the Allentown Inc system FIAS (Facility Integrated Airflow Solutions).

FIGS. 11A-11D and FIG. 12 illustrate an alternate embodiment of cage assembly 200 in which items shown with the same reference numerals from FIGS. 1A-FIG. 10 are the same. Cage assembly 200 includes lip 212 which extends around cage bottom 213 below top portion 214. One or more grooves 215 can be formed in lip 212. Card holder 300 replaces card holder 50 shown in FIG. 1A. Card holder 300 includes base 313. Flange 316 and flange 317 extend from rear 318 of base 313. Clip card holder 319 extends from front 320 of base 313. Flange 316 and flange 317 can slide over lip 212 to attach card holder 300 to cage assembly 200.

Figure 13A:
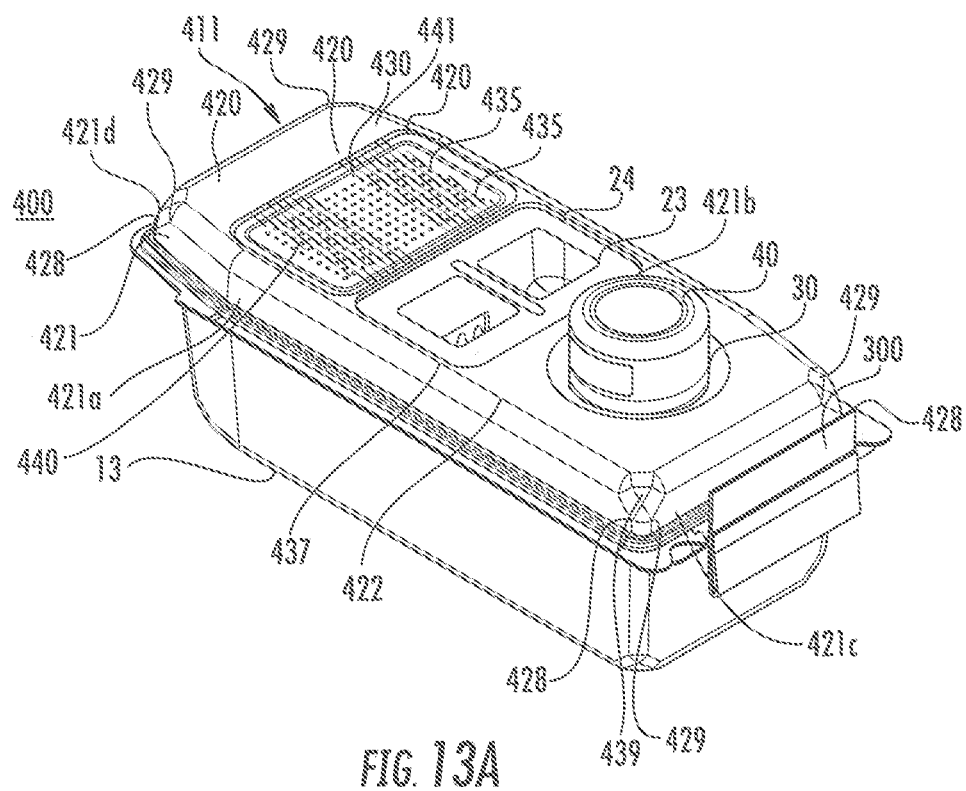
FIG. 13A illustrates a perspective view of an animal cage assembly in accordance with the teachings of the present invention.
Figure 13B:
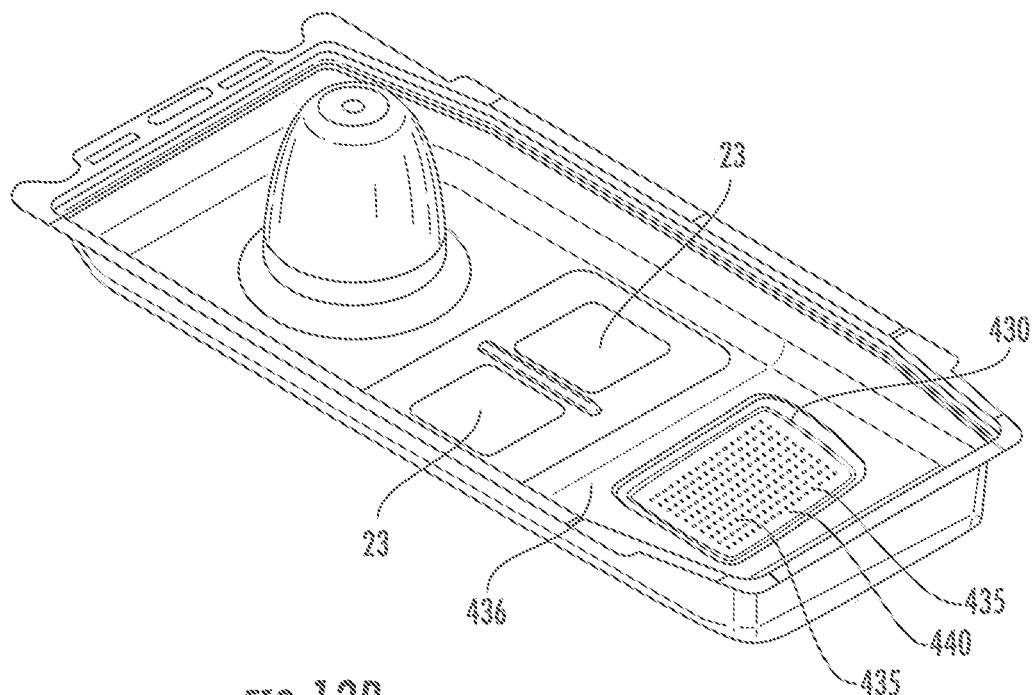
FIG. 13B illustrates a bottom view of the cage top shown in FIG. 13A.

FIGS. 13A-13B illustrate cage assembly 400 in accordance with the teachings of the present invention including cage 411 in which items shown with the same reference numerals from FIGS. 1A-FIG. 12 are the same. Cage assembly 400 can be a static cage or ventilated cage. Cage 411 includes cage base 13 and cage top 420. Water housing mount pocket 30 is formed in cage top 420. Water housing 40 is removably received in water housing mount pocket 30.

Cage top 420 includes walls 421 extending from ceiling 422. Walls 421 and ceiling 422 can be integral to one another. Ceiling 422 can be substantially flat. Walls 421 may or may not include side walls 421a and 421b on either side of cage top 420. Walls 421 may or may not include front wall 421c and rear wall 421d. Edge junction 428 can be formed between adjacent walls 421. For example, edge junction 428 can be formed respectively between side wall 421a and front wall 421c and side wall 421a and rear wall 421d. Edge junction 428 can be formed respectively between side wall 421b and front wall 421c and side wall 421b and rear wall 421d. Corner junction 429 can be formed between adjacent walls 421 and ceiling 422. For example, corner junction 429 can be formed respectively between: side wall 421a, front wall 421c and ceiling 422; side wall 421a, rear wall 421d and ceiling 422; side wall 421b, front wall 421c and ceiling 242; and side wall 421b, rear wall 421d and ceiling 422.

One or more openings 23 can be formed in ceiling 422. One or more openings 23 can be covered by one or more filters 24. One or more openings 23 can be used to to receive and exhaust air for ventilation of cage 411.

Ceiling 422 can include perforation section 430. Perforation section 430 includes a plurality of apertures 435. Apertures 435 are within close proximity to each other. Apertures 435 can be small. In one embodiment, apertures 435 can have a size in the range of about 0.031 to about 0.125 inches and a spacing between apertures 435 in the range of about 0.031 to about 0.125 inches. In one embodiment, apertures 435 can have a size in the range of about 0.0625 to about 0.125 inches and a spacing between apertures 435 in the range of about 0.0625 to about 0.125 inches.

Apertures 435 can be manufactured by being drilled, milled, punched or any other method of removing material from ceiling 422. In one embodiment, apertures 435 are formed from inside surface 437 to outside surface 439 of cage top 420. One or more burrs 440 may be formed on outside surface 439 of cage top 420 during removal of material from ceiling 422 as shown in FIG. 13A.

Alternatively, apertures 435 are formed from outside surface 439 to inside surface 437 of cage top 420. One or more burrs 440 can be formed on inside surface 437 of cage top 420. In this embodiment, perforation section 430 is located in an area which is difficult for the animal access as shown in FIG. 13B. In alternative embodiments perforation section 430 can be located at other locations of cage base 13 and cage top 420 for example walls 421 and walls 16.

Figure 14:
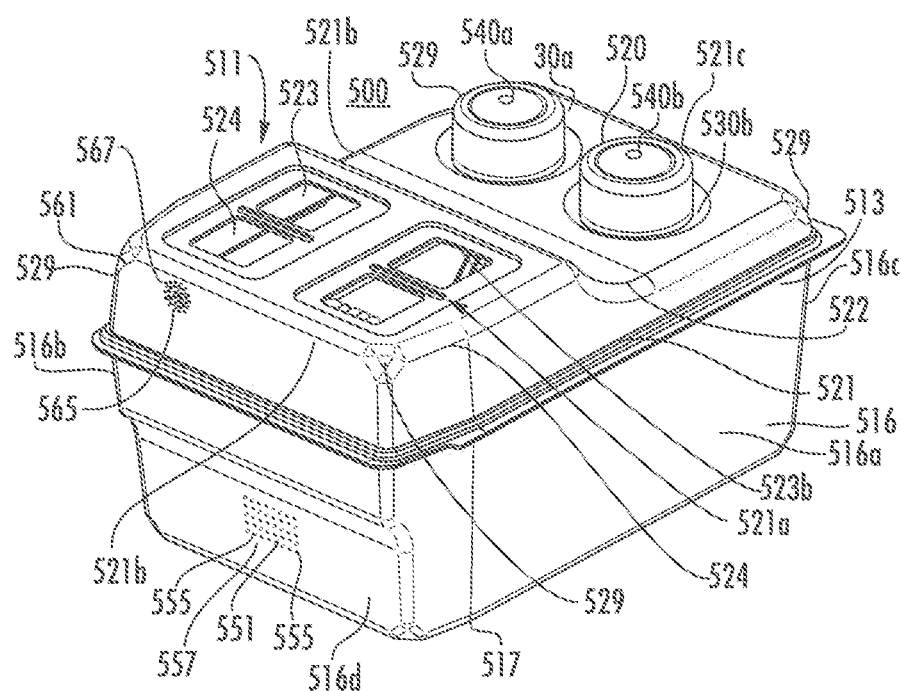
FIG. 14 illustrates a perspective view of an animal cage assembly in accordance with the teachings of the present invention.

FIG. 14 illustrates cage assembly 500 in accordance with the teachings of the present invention including cage 511. Cage 511 includes cage base 513 and cage top 520. For example, cage 511 can be used to house rats. Cage top 520 includes walls 521 extending from ceiling 522. Walls 521 and ceiling 522 can be integral to one another. Walls 521 may or may not include side walls 521a and 521b on either side of cage top 520. Walls 521 may or may not include front wall 521c and rear wall 521d. One or Openings 523a and 523b can be formed in ceiling 522. Openings 523a and 523b can be covered by one or more filters 524.

Water housing mount pocket 530a and water housing mount pocket 530b are formed in cage top 420 in a lateral side by side configuration. Water housing mount pocket 530a can be positioned adjacent opening 523a. Water housing mount pocket 530b can be positioned adjacent opening 523b. Water housing 540a is removably received in water housing mount pocket 530a. Water housing 540b is removably received in water mount pocket 530b.

Figure 15A:
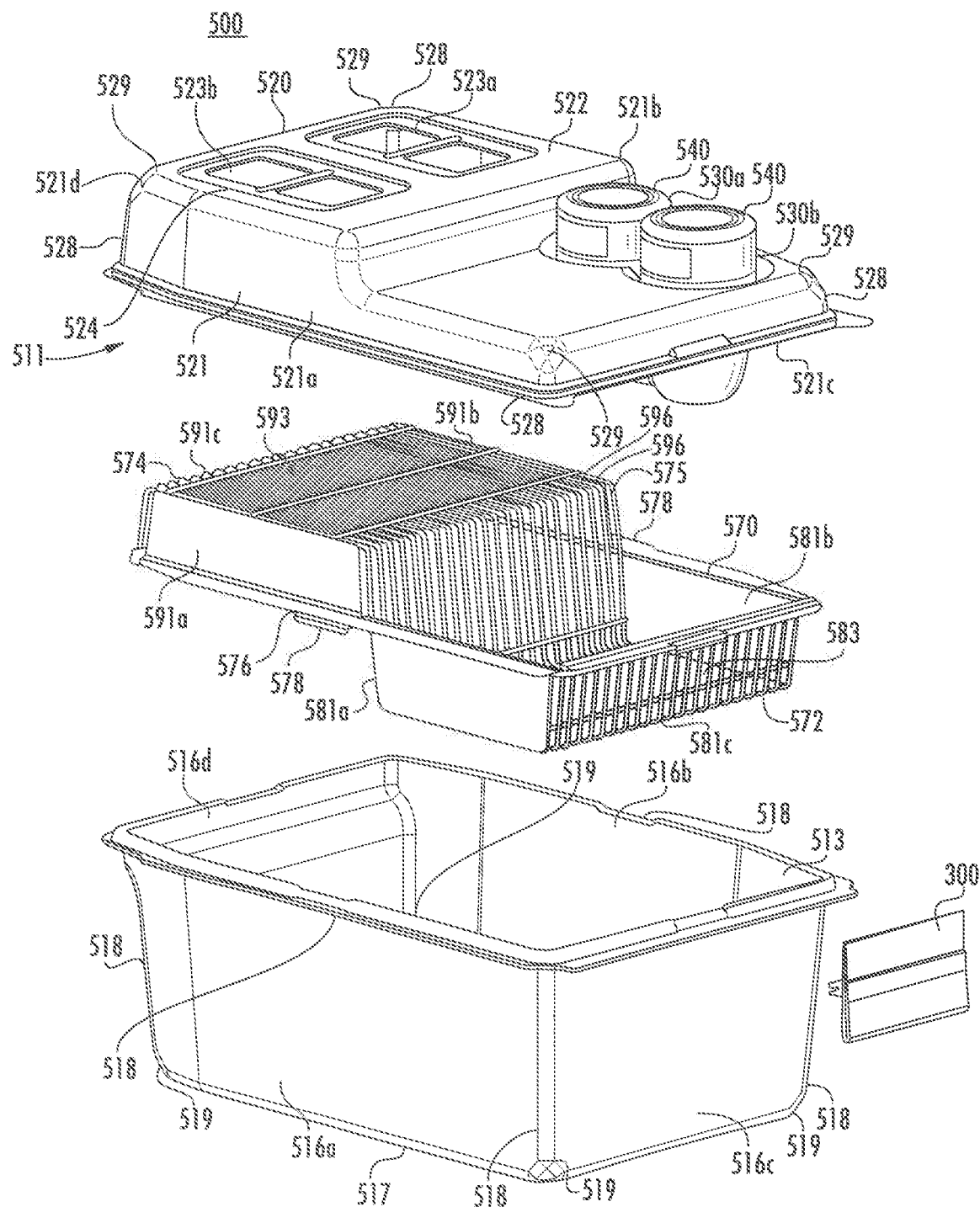
FIG. 15A illustrates a perspective view of the animal cage assembly before being assembled in accordance with the teachings of the present invention.

Referring to FIG. 15A, in an alternate embodiment, water housing mount pocket 530a and water housing mount pocket 530b can be formed in cage top 420 in a longitudinal side by side configuration. Water housing mount pocket 530a and water housing mount pocket 530b can be positioned on the same side as opening 523a. Water housing mount pocket 530a can be positioned adjacent opening 523a. Water housing mount pocket 530b is positioned adjacent wall 521c in front of water housing mount pocket 530a. Water housing 540a is removably received in water housing mount pocket 530a. Water housing 540b is removably received in water mount pocket 530b.

Cage base 513 includes walls 516 extending from floor 517. Walls 516 and floor 517 can be integral to one another. Walls 516 can include side walls 516a and 516b on either side of cage base 513. Walls 516 can include front wall 516c and rear wall 516d. Top edge 514 of side walls 516a and 516b can include depressions 518. Edge junction 518 can be formed between adjacent walls 516. For example, edge junction 518 can be formed respectively between side wall 516a and front wall 516c and side wall 516a and rear wall 516d. Edge junction 518 can be formed respectively between side wall 516b and front wall 516c and side wall 516b and rear wall 516d. Corner junction 519 can be formed between adjacent walls 516 and floor 517. For example, corner junction 519 can be formed respectively between: side wall 516a, front wall 516c and floor 517; side wall 516a, rear wall 516d and floor 517; side wall 516b, front wall 516c and floor 517; and side wall 516b, rear wall 516d and floor 517.

Edge junction 528 can be formed between adjacent walls 521. For example, edge junction 528 can be formed respectively between side wall 521a and front wall 521c and side wall 521a and rear wall 521d. Edge junction 528 can be formed respectively between side wall 521b and front wall 521c and side wall 521b and rear wall 521d. Corner junction 529 can be formed between adjacent walls 521 and ceiling 522. For example, corner junction 529 can be formed respectively between: side wall 521a, front wall 521c and ceiling 522; side wall 521a, rear wall 521d and ceiling 522; side wall 521b, front wall 521c and ceiling 522; and side wall 521b, rear wall 521d and ceiling 522.

Structure 570 can include front section 572 and rear section 574. Middle section 575 can join front section 572 to rear section 574. Front section 574 includes side walls 581a and 581b extending from bottom 583. Front wall 581c extends from bottom 583. Rear section 574 includes side walls 591a and 591b extending from top 593. Rear wall 591c extends from top 593. Front section 572, rear section 574 and middle section 575 can be formed of a plurality of wires 596 in a side by side configuration. Alternatively, structure 570 can be formed of sheet metal in a frame configuration. Front section 572 extends below water mount housing mount pockets 530a and 530b. Rear section 574 extends below opening 523a and 523b. Front section 572 and rear section 574 prevent animals from reaching or gnawing on water mount pockets 530a and 530b and openings 523a and 523b.

Figure 15B:
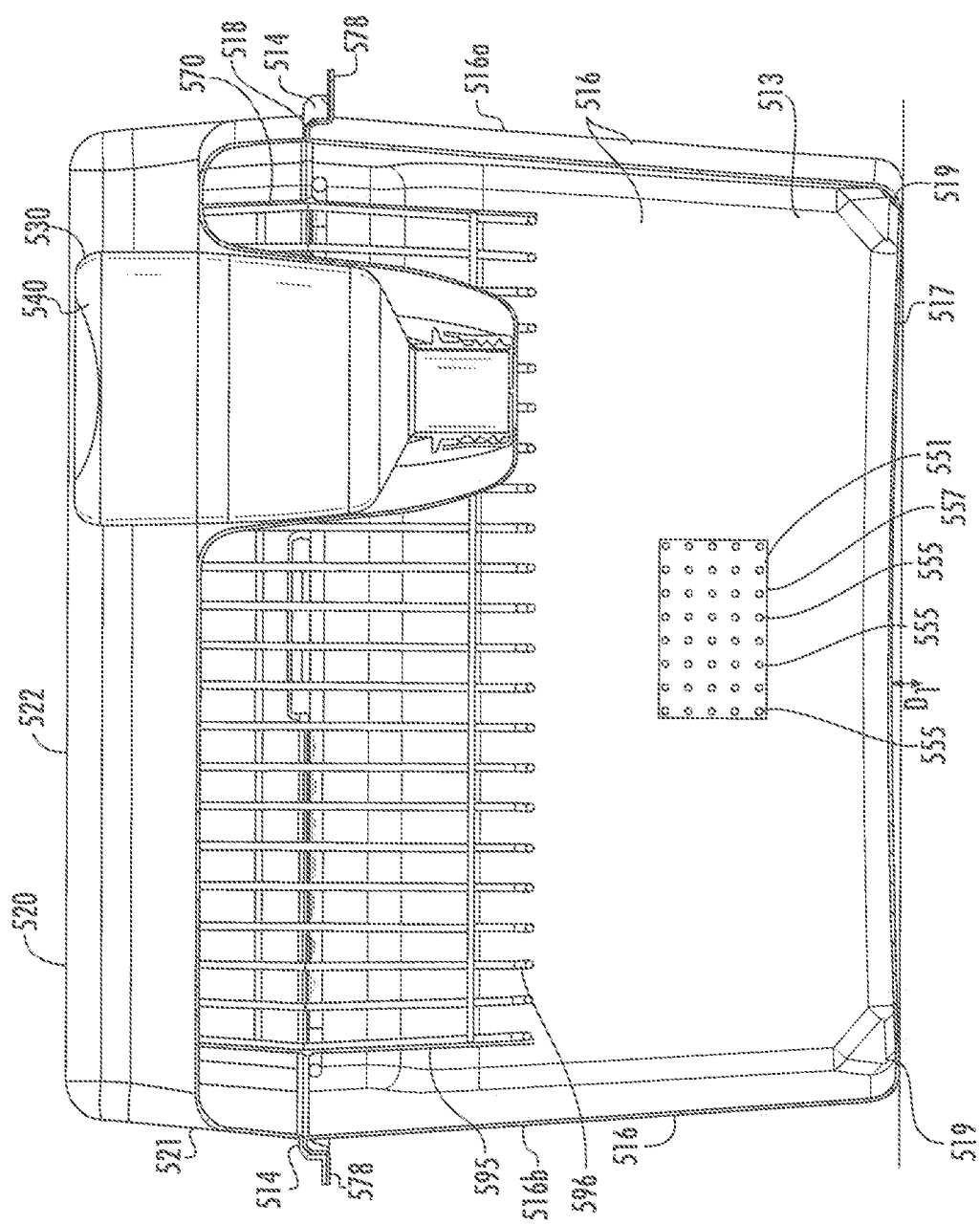
FIG. 15B illustrates a cross sectional view of the animal cage assembly shown in FIG. 15A.

Flange 578 can extend laterally from side wall 591a and 591b. Flanges 578 extending from side wall 591a and side wall 591b can be received in depressions 518 of respective side wall 516a and side wall 516b as shown in FIG. 15B for supporting structure 570. Cage top 520 can be received over structure 570. Walls 516 of cage base 513 support cage top 520 and structure 570 on top edge 514. Cage bottom 513 can be counter bowed a distance of D1 to strengthen cage bottom 513 and minimize or eliminate sagging.

Air inlet port 551 can include a plurality of apertures 555 for receiving incoming air when used in combination with air delivery and exhaust system 100 as shown in FIG. 9. Referring to FIG. 15B, filter 512 can cover air inlet port 511.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A animal cage comprising:
   cage top including one or more walls extending from a ceiling, and
   a cage base, said cage base including one or more walls extending from a floor, said ceiling and/or said base including a perforation section, said perforation section including a plurality of apertures,
   wherein at least one edge junction of the one or more walls of the cage base and/or at least one corner junction of the one or more wall or walls of the cage base and the floor are defined by curved surfaces of a first shape, the first shape is a parabola, ellipse, hyperbola or spline and at least one edge junction of the one or more wall of the cage top and/or at least one corner junction of the one or more wall or walls of the cage top and the ceiling are defined by curved surfaces of a second shape the second shape is a parabola ellipse, hyperbola or spline.

2. The animal cage of claim 1 wherein the apertures have a size in a range of about 0.031 to about 0.125 inches.

3. The animal cage of claim 2 wherein a spacing between the apertures is in a range of about 0.031 to about 0.125 inches.

4. The animal cage of claim 1 wherein the apertures are formed from an inside surface of the cage to an outside surface of the cage.

5. The animal cage of claim 1 wherein the at least one edge junction of the one or more walls of the cage base and/or the at least one corner junction of the one or more wall or walls of the cage base and the floor are defined by surfaces having an angle greater than or equal to about 180 degrees and less than or equal to about 360 degrees.

6. The animal cage of claim 1, wherein the at least one edge junction of the one or more walls of the cage top and/or the at least one corner junction of the one or more wall or walls of the cage top and the ceiling are defined by surfaces having an angle greater than or equal to about 180 degrees and less than or equal to about 360 degrees.

7. The animal cage of claim 1 wherein at least one walls extending from the ceiling and/or the at least one wall extending from the floor have a material thickness between about 0.005 to about 0.125 inches.

8. The animal cage of claim 1 wherein the floor and/or the ceiling have a material thickness between about 0.005 to about 0.125 inches.

9. The animal cage of claim 1 further comprising:
   a water housing mount pocket formed in the cage top, the water housing mount pocket being adapted to receive a container, wherein the water housing mount pocket includes a conical support, a bottom end of the conical support including an aperture, the conical support includes a conical section between the bottom end and an upper end of the conical support.

10. The animal cage of claim 9, wherein the conical section has a shape of a parabola, ellipse, hyperbola or spline.

11. The animal cage of claim 9, wherein the ceiling of the cage top includes one or more openings, the one or more openings being covered respectively by one or more filters, a feed tray being positioned beneath the one or more filters after the cage top is attached to the cage base.

12. The animal cage of claim 1 wherein the floor of the cage bottom is counter bowed a predetermined distance.

13. The animal cage of claim 1 wherein the cage top and the cage bottom are formed of a polymer.

14. An animal cage comprising:
   a cage top, said cage top including one or more walls extending from a ceiling;
   a cage base, said cage base including one or more walls extending from a floor;
   the ceiling of the cage top includes one or more openings, the one or more openings being covered respectively by one or more filters;
   one or more water housing mount pockets formed in the ceiling, the water housing mount pocket includes a conical support, the conical support includes a conical section between a bottom end and an upper end of the conical support; and
   a structure including a front section and a rear section, the structure configured to be received under said cage top, the front section being positioned below said water housing mount pocket and the rear section being positioned below the one or more openings,
   wherein at least one edge junction of the one or more walls of the cage base and/or at least one corner junction of the one or more wall or walls of the cage base and the floor are defined by curved surfaces of a first shape, the first shape is a parabola, ellipse, hyperbola or spline and at least one edge junction of the one or more wall of the cage top and/or at least one corner junction of the one or more wall or walls of the cage top and the ceiling are defined by curved surfaces of a second shape, the second shape is a parabola ellipse, hyperbola or spline.

15. An animal cage system comprises:
   at least one cage;
   the at least one cage comprising a cage top, said cage top including one or more walls extending from a ceiling, a cage base, said cage base including one or more walls extending from a floor, the ceiling of the cage top includes one or more openings, the one or more openings being covered respectively by one or more filters, one or more water housing mount pockets formed in the ceiling, the water housing mount pocket includes a conical support, the conical support includes a conical section between a bottom end and an upper end of the conical support, and a structure including a front section and a rear section, the structure configured to be received under said cage top, the front section being positioned below said water housing mount pocket and the rear section being positioned below the one or more openings; and a rack for supporting the at least one cage;

wherein at least one edge junction of the one or more walls of the cage base and/or at least one corner junction of the one or more wall or walls of the cage base and the floor are defined by curved surfaces of a first shape, the first shape being a parabola, ellipse, hyperbola or spline and wherein a cage base and the cage top are snap fit together and the rack includes a suspended runner system for automatically locking the cage base and the cage top together when the cage top and cage base are inserted into the rack.

16. The animal cage system of claim 15 further comprising:

an air supply supplying air to the at least one animal cage and an exhaust plenum receiving exhaust from the at least one cage, the air from the air supply passes through said at least one cage to exit the cage as exhaust.

17. The animal cage system of claim 15 wherein the cage base includes a top edge which extends from the cage base, the top edge being received in a suspended runner system.

18. The animal cage system of claim 15 wherein the structure comprises a plurality of wires.

* * * * *